United States Patent [19]

Omori et al.

[11] Patent Number: 4,727,232
[45] Date of Patent: Feb. 23, 1988

[54] METHOD FOR JOINING TWO METAL PLATES WITH SEALANT THEREBETWEEN

[75] Inventors: Kiyoshi Omori, Utsunomiya; Nobuya Shinozaki, Mooka; Tatsuo Masuda, Yokohama, all of Japan

[73] Assignees: Nissan Motor Co., Ltd.; Kato Hatsujo Kaisha Limited, both of Yokoyama, Japan

[21] Appl. No.: 920,082

[22] Filed: Oct. 17, 1986

[30] Foreign Application Priority Data

Oct. 18, 1985 [JP]  Japan ................................ 60-232749

[51] Int. Cl.$^4$ ................................................. B23K 11/10
[52] U.S. Cl. ...................................... 219/91.2; 219/118
[58] Field of Search ............... 219/91.2, 91.21, 91.22, 219/117.1, 118

[56] References Cited

U.S. PATENT DOCUMENTS

| | | | |
|---|---|---|---|
| 3,967,091 | 6/1976 | Vaughan et al. | 219/118 X |
| 4,195,215 | 3/1980 | Clark | 219/91.21 |
| 4,471,519 | 9/1984 | Capello et al. | 219/91.2 X |

FOREIGN PATENT DOCUMENTS 2095269  9/1982  United Kingdom .
2143533  2/1985  United Kingdom ................ 219/118

*Primary Examiner*—E. A. Goldberg
*Assistant Examiner*—C. M. Sigda
*Attorney, Agent, or Firm*—Schwartz, Jeffery, Schwaab, Mack, Blumenthal & Evans

[57] ABSTRACT

End portions of first and second metal plates are overlapped with non-cured sealant interposed therebetween. Spot-welding is applied to the overlapped end portions to assure tight joining between the first and second metal plates. The joined metal plates are then coated with paint and put in an oven for not only drying the paint but also melting the sealant. During this drying process, the melted sealant flows into an entire clearance defined between the overlapped end portions of the first and second metal plates. The joined first and second metal plates are then cooled to solidify the sealant.

5 Claims, 3 Drawing Figures

METHOD FOR JOINING TWO METAL PLATES WITH SEALANT THEREBETWEEN

BACKGROUND OF THE INVENTION

1. Field of the Invention

The present invention relates in general to a method for joining two metal plates by using so-called spot welding, and more particularly to such a joining method as above, which also assures sealing between the joined two metal plates.

2. Description of the Prior Art

In order to clarify the task of the present invention, one conventional method for sealingly joining two metal plates by using spot-welding and sealing members will be outlined with reference to FIG. 2, which method is widely employed in automobile makers.

Referring to FIG. 2, there are shown two metal plates 10 and 12 which are sealingly spot-welded at their mutually overlapped end portions 10a and 12a. The joining is achieved by taking the following steps.

First and second metal plates 10 and 12 are prepared, the plate 10 having at its one end portion 10a a laterally extending grooved ridge 10b which is press-formed. Then, the end portions 10a and 12a of the metal plates 10 and 12 are properly overlapped one over the other with an elongate seal bar 20 received in the groove 10b, that is, in a space 22 defined between the groove 10b and the end portion 12a of the second metal plate 12. The seal bar 20 is constructed of a nitrile rubber of a type which expands somewhat when heated. Spot-welding is then applied to given portions 24 of the mutually overlapped end portions 10a and 12a to assure tight joining between the two metal plates 10 and 12. Then, a sealant 26 in viscous condition is applied to the edge 10c of the first metal plate 10 having a longitudinally extending part thereof in contact with the end portion 12a of the second metal plate 12. The sealant 26 is made of a thermoplastic material, such as a polymer containing mainly a polyvinyl chloride.

Then, the metal plates 10 and 12 thus joined are entirely coated with suitable paint and put in an oven for drying the paint. The drying process is carried out for about 30 minutes at a temperature between 160° C. and 170° C.

During this drying process, the seal bar 20 expands somewhat thereby filling the space 22 and thus assuring a sealing at the positions adjacent the seal bar 20. At the same time, the sealant 26 is cured.

When the drying process terminates, the joined two metal plates 10 and 12 are exposed to a room temperature atmosphere to cool. With this cooling process, the sealant 26 is solidified thereby achieving a sealing at the positions near the edge 10c of the first metal plate 10.

However, due to its inherency, the following drawbacks are encountered in the above-mentioned conventional joining method.

First, for the sealing, there are employed two sealing means, viz., the seal bar 20 and the sealant 26, and there is a need to provide the first metal plate 10 with the grooved ridge 10b. These induce a troublesome production process.

Second, when the joined two metal plates 10 and 12 are subjected to a considerable torsional stress, the solidified sealant 26 tends to peel off thereby deteriorating the sealing property thereof. This is because of the limited contact area of the sealant 26 relative to the first and second metal plates 10 and 12.

SUMMARY OF THE INVENTION

It is therefore an object of the present invention to provide an improved joining method which is free of the above-mentioned drawbacks.

According to the present invention, there is provided a method for joining two metal plates, which comprises in steps, preparing first and second metal plates each having an end portion, applying a non-cured sealant to one of the end portions of the first and second metal plates, overlapping the end portions of the first and second metal plates one over the other with the non-cured sealant interposed therebetween, spot-welding the overlapped end portions of the first and second metal plates together, coating the joined first and second metal plates with paint, heating the joined first and second metal plates at a temperature sufficient for not only drying the paint but also melting the non-cured sealant, and cooling the joined first and second metal plates so as to solidify the sealant.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, a method according to the present invention will be described in detail with reference to FIGS. 1A and 1B.

Figure 1A:
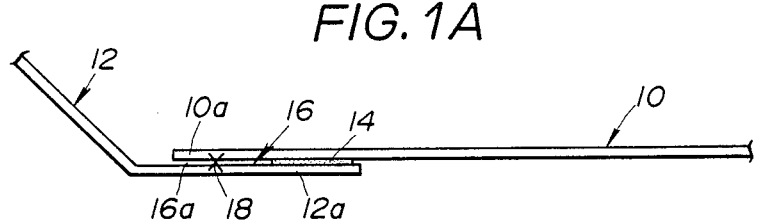
FIG. 1A is a sectional view of two metal plates joined by a method according to the present invention, but showing an initial condition of a sealant applied between the metal plates.
Figure 1B:
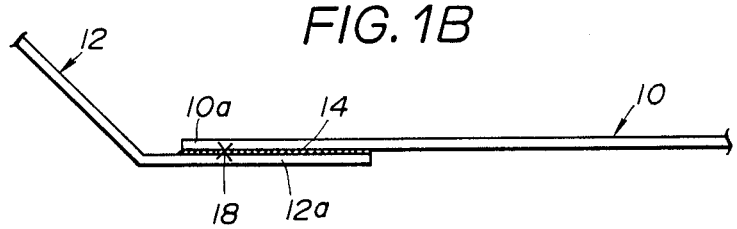
FIG. 1B is a view similar to FIG. 1A, but showing a final condition of the sealant between the metal plates.
Figure 2:
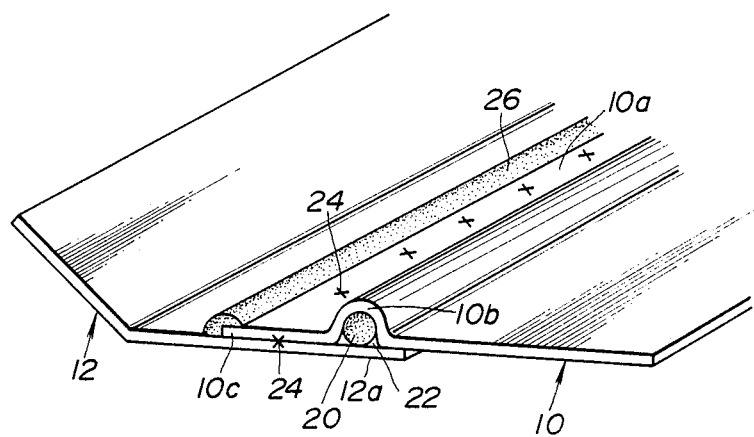
FIG. 2 is a perspective view of two metal plates joined by a conventional method.

As will be understood from FIG. 1A, before overlapping end portions 10a and 12a of first and second metal plates 10 and 12 one over the other, a sealant 14 in non-cured condition is attached to one of the end portions 10a and 12a of the metal plates 10 and 12. Preferably, for assured spot-welding subsequently carried out, the sealant application is made to such a position that upon overlapping of the end portions 10a and 12a, the sealant 14 in a clearance 16 between the end portions 10a and 12a is placed apart from a position 16a where the subsequent spot-welding is practically applied. The sealant 14 is a non-cured mixture which contains 9-parts of ethylene vinyl acetate by weight and 1-part of adhesive polymer by weight. For easy handling, the sealant 14 may be formed like a strap.

Then, the end portions 10a and 12a of the metal plates 10 and 12 are properly overlapped one over the other and spot-welding is applied to given portions 18 of the overlapped end portions 10a and 12a to assure tight joining between the first and second metal plates 10 and 12. Preferably; the spot-welding to the end portions 10a and 12a is made at equally spaced intervals.

Then, the metal plates 10 and 12 thus joined are entirely coated with paint and put into an oven for drying the paint. The drying process is carried out for about 30 minutes at a temperature between 150° C. and 175° C. Of course, these conditions are varied in accordance with the property of the sealant 14.

During this drying process, the sealant 14 between the end portions 10a and 12a is melted because of the heat applied thereto, and the melted sealant 14 flows into the entire clearance 16 of the joined end portions 10a and 12a of the metal plates 10 and 12.

When the drying process terminates, the joined metal plates 10 and 12 are exposed to a room temperature atmosphere to cool. With this cooling process, the sealant 14 is sufficiently cured and thus solidified thereby assuring the sealing between the end portions 10a and 12a of the metal plates 10 and 12.

As is described hereinabove, in accordance with the present invention, only one sealing means (that is, the sealant 14) is employed, and there is no need for providing one of the metal plates 10 and 12 with a grooved ridge. Thus, a simple and low-cost metal joining process is achieved in accordance with the present invention.

Since the sealant melting process is simultaneously carried out during the paint drying process, the time required for metal joining is shortened. This results in a low-cost production of joined panels.

Since the melted sealant 14 flows into the limited clearance 16 and is thereafter solidified, the contact area of the solidified sealant 14 relative to the associated plates is considerably large. Thus, the adhesive strength of the sealant 14 to the metal plates is increased. Thus, the undesirable peel off phenomenon of the sealant 14 does not occur. Furthermore, due to the increased contract area of the sealant, the sealing property is much improved as compared with that of the afore-mentioned conventional method.

What is claimed is:

1. A method for joining two metal plates, comprising the following steps:

(a) preparing first and second metal plates each having an end portion;
   (b) applying a non-cured sealant to one of the end portions of said first and second metal plates;
   (c) overlapping the end portions of said first and second metal plates with said non-cured sealant interposed therebetween;
   (d) spot-welding the overlapped end portions of said first and second metal plates together, the portions of the end portions to which the spot-welding is applied being placed apart from the portions of the end portions to which said non-cured sealant has been previously applied;
   (e) coating the joined first and second metal plates with paint;
   (f) heating the joined first and second metal plates at a temperature sufficient for not only drying the paint but also melting said non-cured sealant, such that the melted sealant flows into the entire clearance between the overlapped end portions of the first and second metal plates; and
   (g) cooling the joined first and second metal plates so as to solidify the sealant.

2. A method as claimed in claim 1, in which said non-cured sealant is a mixture which contains 9-parts of ethylene vinyl acetate by weight and 1-part of adhesive polymer by weight.

3. A method as claimed in claim 3 in which said non-cured sealant is formed like a strap.

4. A method as claimed in claim 1, in which in the step (d), the spot-welding to the end portions of said first and second metal plates is made at equally spaced intervals.

5. A method as claimed in claim 1, in which said step (f) is a paint drying step which is carried out for approximately 30 minutes at a temperature between 150° C. and 175° C.

* * * * *